US010460151B2

(12) United States Patent
Jacobs

(10) Patent No.: US 10,460,151 B2
(45) Date of Patent: Oct. 29, 2019

(54) PRIVATE PHOTO SHARING SYSTEM, METHOD AND NETWORK

(71) Applicant: Cloudspotter Technologies, Inc., Highland Park, IL (US)

(72) Inventor: Ryan Jacobs, Highland Park, IL (US)

(73) Assignee: CloudSpotter Technologies, Inc., Highland Park, IL (US)

( * ) Notice: Subject to any disclaimer, the term of this patent is extended or adjusted under 35 U.S.C. 154(b) by 167 days.

(21) Appl. No.: 14/489,116

(22) Filed: Sep. 17, 2014

(65) Prior Publication Data

US 2015/0081791 A1    Mar. 19, 2015

Related U.S. Application Data

(60) Provisional application No. 61/878,949, filed on Sep. 17, 2013.

(51) Int. Cl.
| G06F 15/16 | (2006.01) |
| G06K 9/00 | (2006.01) |
| G06F 16/583 | (2019.01) |
| H04L 29/08 | (2006.01) |

(52) U.S. Cl.
CPC ....... *G06K 9/00221* (2013.01); *G06F 16/583* (2019.01); *G06K 9/00288* (2013.01); *H04L 67/06* (2013.01)

(58) Field of Classification Search
CPC .......... G06K 9/00221; G06F 17/30247; H04L 67/06
USPC ....................................................... 709/204
See application file for complete search history.

(56) References Cited

U.S. PATENT DOCUMENTS

| 2009/0185723 A1* | 7/2009 | Kurtz | G06K 9/00288 |
| | | | 382/118 |
| 2010/0158315 A1* | 6/2010 | Martin | G06F 17/30247 |
| | | | 382/103 |
| 2011/0188713 A1* | 8/2011 | Chin | G06F 17/30247 |
| | | | 382/118 |
| 2012/0250950 A1* | 10/2012 | Papakipos | G06F 17/30247 |
| | | | 382/118 |

* cited by examiner

*Primary Examiner* — Sm A Rahman
(74) *Attorney, Agent, or Firm* — Adam K. Sacharoff; Much Shelist, P.C.

(57) ABSTRACT

The present invention is a photograph sharing process and/or system that allows professional photographers, who photograph weddings or other events where large numbers of photographs containing varying subject, to send photographs in which a subject or individual appears directly to that particular individual. Thus, the photographs are shared only with intended recipients and may be viewed essentially simultaneously or in close proximity to the photographed event.

9 Claims, 5 Drawing Sheets

PRIVATE PHOTO SHARING SYSTEM, METHOD AND NETWORK

CROSS-REFERENCES TO RELATED APPLICATION

The application claims priority to U.S. Provisional Patent Application No. 61/878,949 filed Sep. 17, 2013, entitled "Private Photo Sharing System, Method and Network", the entire contents of which is incorporated herein by this reference.

FIELD OF INVENTION

The present invention generally relates to a process and system for sharing photographs. The present invention also relates to a photo sharing network among and between users of the network.

BACKGROUND OF THE INVENTION

More photos are being taken now than ever before and photograph sharing among and between people is becoming more and more popular. Arguably, the most heavily shared images are social photographs, that is, photographs of social nature including people as subjects which may be taken at events, such as weddings, parties, sporting, and other events, or which may also be taken elsewhere, beyond the confines of an event. People photographed generally have a strong desire to gain access to the photographs they are in, and those individuals who snap a photograph of people often have a moderate desire to share that photograph with those people in the photograph. While over time advances in digital, Internet, and mobile technologies have continued to lower barriers to sharing photographs, there are still significant challenges associated with doing so, and particularly with privately sharing photographs with intended recipients. Currently, it is common for photographs to be shared via email, text message, Facebook, and Instagram to name a few sharing methods, and placed on websites to which persons interested in accessing photographs can go to view, retrieve, download, or purchase the photographs. While the aforementioned sharing methods and technologies make it easier now to share photos than ever before, there are a few major drawbacks to these sharing methods. First, these sharing methods are not automatic; they require manual activity not only on the part of the photo-sharer, but to varying extents also on the part of the photo-share, and, as a result of such hurdles, often photographs are not successfully shared. Secondly, photos files are being shared through a wide variety of mediums and are being stored in a wide variety of locations, which can make accessing and managing photos very challenging. Yet another significant drawback to several of these sharing methods is that the photographs may become public domain, or semi-public domain, accessible by either a very small amount or larger amount of people whom either the publisher of the photographs and/or the subjects in the photographs may not want to view them, or by recipients who do not wish to view them.

Moreover, in the case of professional photographs taken at weddings and other events, proof books or website links are often sent around to the people who engaged the photographer(s) and sometimes to other event attendees who might be interested in accessing some of the photographs. This results in a delay between the event and the ability of attendees to access photographs in a timely fashion. This also requires effort on behalf of users to seek out the photos that they may want access to.

SUMMARY OF THE INVENTION

In one embodiment, the photograph sharing process and system of the present invention allows professional photographers, who photograph weddings or other events where large numbers of photographs containing varying subject, to send photographs in which the subject appears directly to that particular individual. Thus, the photographs are shared only with intended recipients and may be viewed essentially simultaneously. In this embodiment, the photograph sharing process includes the steps of associating a photograph with a file name and with a subject identifier (such as a name, email address, cell phone or other unique identifier) or identifiers, in the case of sharing a photo with multiple recipients. This process also includes creating a database record on the server for the photograph file name and subject identifier. The database record and photograph are uploaded to a server. The photograph, or link to the photograph, is also forwarded to the subject(s) associated using the subject identifier.

In another embodiment, the photograph sharing process and system of the present invention uses face detection and facial recognition technology to direct photographs taken of individuals, for instance, at an event such as a wedding, to the individual subjects actually appearing in the photographs. In this embodiment, the photograph sharing process includes some form of user registration, whereby a photograph or set of photographs are provided with associated subject identifier and, if more than one face appears in a given photo, a plurality of subject identifiers corresponding to subjects appearing in the photograph(s). The database records containing the photograph file name and subject identifiers, along with the photograph are uploaded to and stored on a server. Face detection and recognition are performed on the uploaded photographs to provide facial metrics for the subjects appearing in the photographs. The facial metrics of the subjects appearing in the photograph(s) are associated with the subjects' identifiers and stored on the server. The photographs used to register users, or a link to these photographs, are forwarded to the subjects. Also, additional photos uploaded to the system may be forwarded to subjects if, after undergoing face detection and recognition are determined to include faces which result in a match, at a pre-determined level of certainty, for subjects when compared against facial metrics belonging to a relevant set of registered user records. It is worth noting that there are several derivations to the aforementioned embodiment. While a professional photographer can send photographs to the server using this system, use of the system need not be limited to a professional photographer or group of professional photographers; individual event attendees can also take photographs with their cameras or SmartPhones which through a variety of potential channels can be sent through the system either during the event or after the event, either alongside or even independent of professional photographer use of the system, similarly resulting in automated private sharing. Also worth noting is the fact that individuals at a given event need not necessarily register at the event; it is possible for individuals to register through a wide variety of ways either in advance or afterwards and still be eligible to automatically receive access to photographs they are in which run through the system.

In a further embodiment, a photograph sharing network process is provided that allows a user to privately aggregate and store large quantities of his or her photographs, while at the same time enables a user to share photographs among and between users of the network. Facial recognition technology allows photographs uploaded to the network to be shared privately between and among users essentially automatically. The network can also alert users when a photograph in which they appear is available within their private account on the network. In this embodiment, the photograph network sharing process includes the steps of providing a user facial metrics upon registration, and storing the user facial metrics on a server. Sets of photographs are uploaded to the server through a variety of ways with the intention to store and privately share these photos. Face detection and recognition is performed on all uploaded photographs to provide facial metrics for subjects appearing in the photographs. The subjects' facial metrics can then be compared to the facial metrics of the uploading user as well as the facial metrics of individuals the uploading user is associated with on the photograph sharing network to determine if there are matches and therefore photographs which can be automatically and privately shared. Photographs uploaded to the system containing a face or faces with facial metrics matching a given user or given users facial metrics become associated with the matching user accounts and are thereafter automatically and privately accessible to those users. As new users join the network and connect with a group of friends, the facial metrics of faces belonging to friend photos are compared with the facial metrics of the new user account. In the case of matches, the new user account will populate with such associated photos. From that point on, anytime that user uploads photos, the facial metrics for individuals in such photos will be compared against the facial metrics for anyone that person is connected to. In a similar fashion, anytime a connection of that user uploads photos, the facial metrics for that user and any of the other users the connection is connected to will be crossed when referencing newly uploaded photos to see if there are matches.

Still a further embodiment includes a photograph with a file name and with a subject identifier taking by a wireless photographic device; a server connected to the Internet for receiving and for creating a database to record and to store the photograph with the file name and with the subject identifier; an input to the server to pre-upload event information associated with the photograph, to pre-upload subjects facial recognition metrics and additional photographs thereof into the database for later comparison with the photograph taken by the wireless photographic device; and forwarding the photograph to a particular subject associated with the photograph using the file name and subject identifier for each subject determined to match the facial recognition metrics with subject identifier stored in the server with event information, wherein a photographer taking photos at weddings or other events where large numbers of photographs containing various subjects enables the photographer to send photographs in which the subject appears directly to the subject with facial metrics and subject identifier in the server.

While the descriptions which follow make reference to photographs, it is important to note that videos, essentially a collection of photograph frames, can also be shared through using the present invention. It will also be apparent that in addition to photographs and videos, the present invention can be used to share documents, or any other digital file.

BRIEF DESCRIPTION OF THE DRAWINGS

To understand the present invention, it will now be described by way of example, with reference to the accompanying drawings in which.

DETAILED DESCRIPTION

Figure 1:
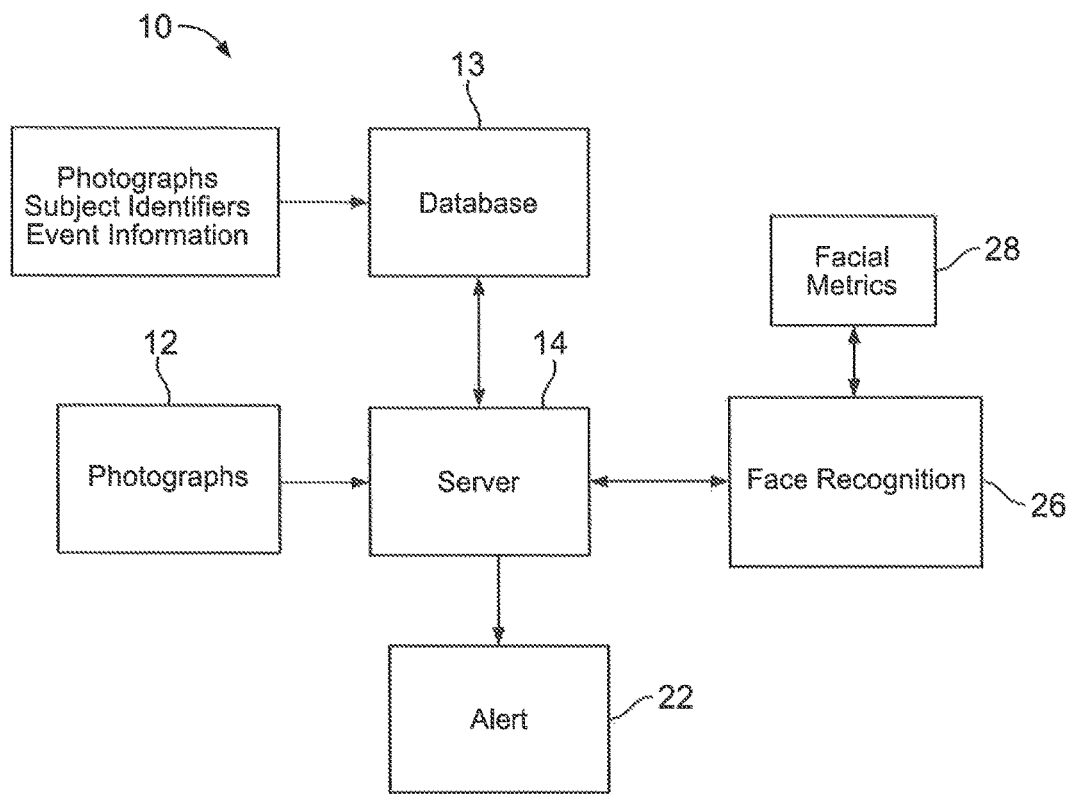
FIG. 1 is a schematic view of a photograph sharing process of an embodiment of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
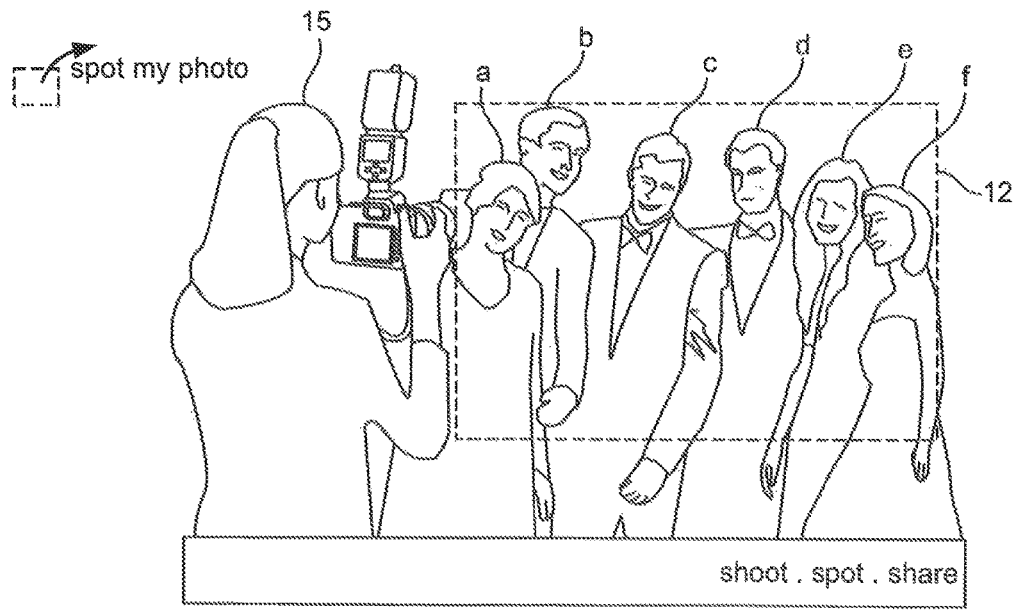
FIG. 2 is a photograph taken in accord with an embodiment of the present invention.

Referring to the Figures, FIG. 1 is a schematic of the photograph sharing process and system 10 of an embodiment of the present invention. Photographs 12 are taken, perhaps at an event such as a wedding, and are uploaded to a server 14 (FIG. 2). The photos 12 can be uploaded to a specified directory on the server 14 using Wi-Fi, Bluetooth, or any other available means. The photos 12 can be in any digital format, and can be sent directly from a camera memory card as a native digital file, or can be digital files rendered from scanned prints or slides.

Figure 3:
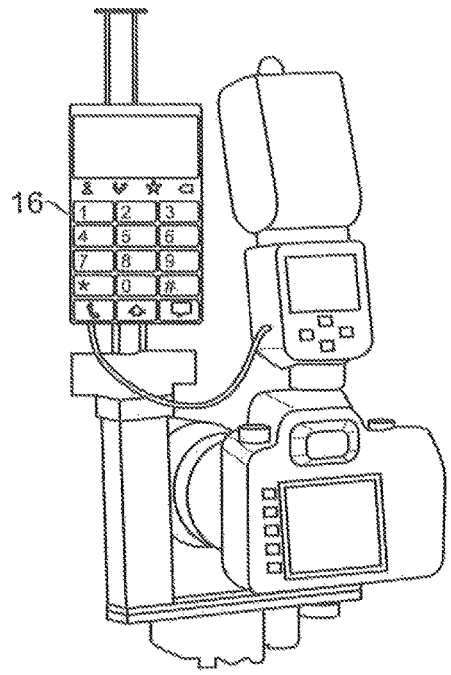
FIG. 3 is an input device in accord with an embodiment of the present invention.
Figure 4:
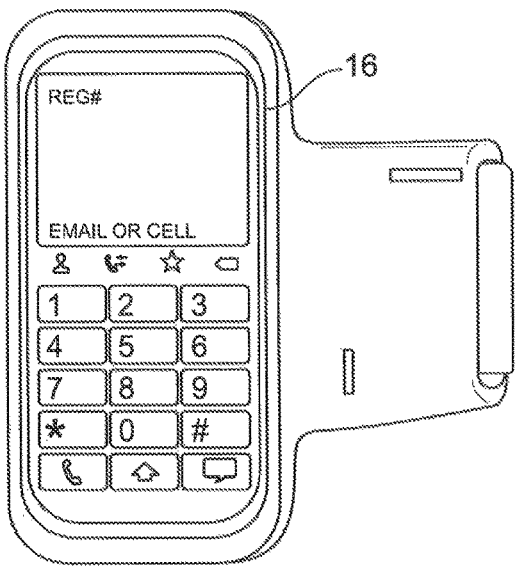
FIG. 4 is an input device in accord with an embodiment of the present invention.
Figure 5:
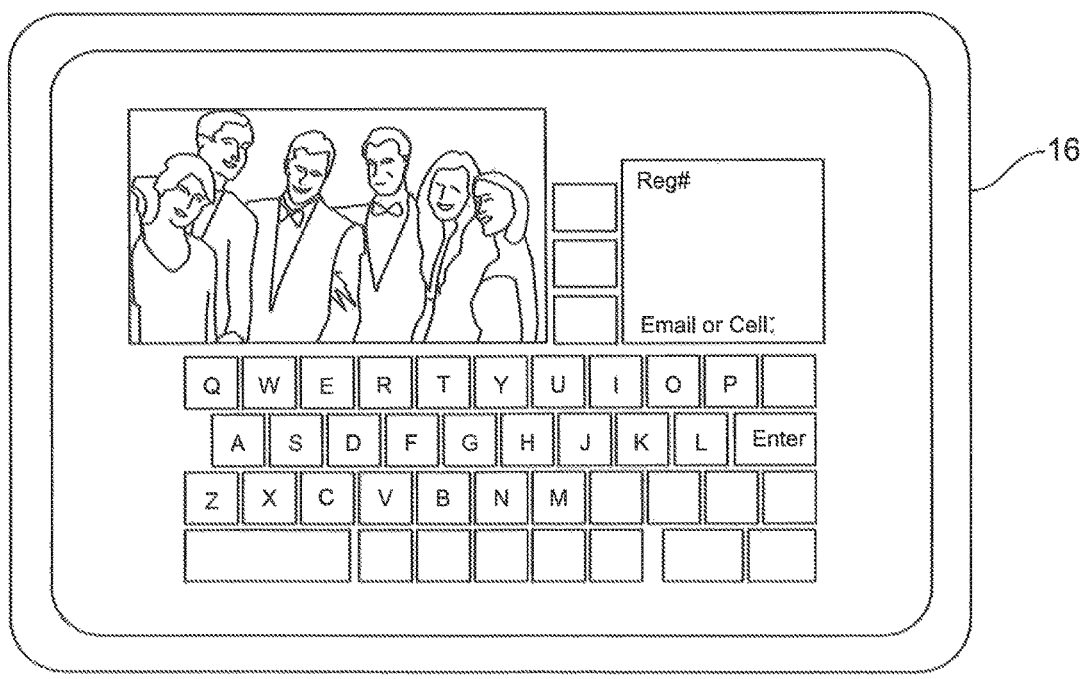
FIG. 5 is an input device in accord with an embodiment of the present invention.
Figure 6:
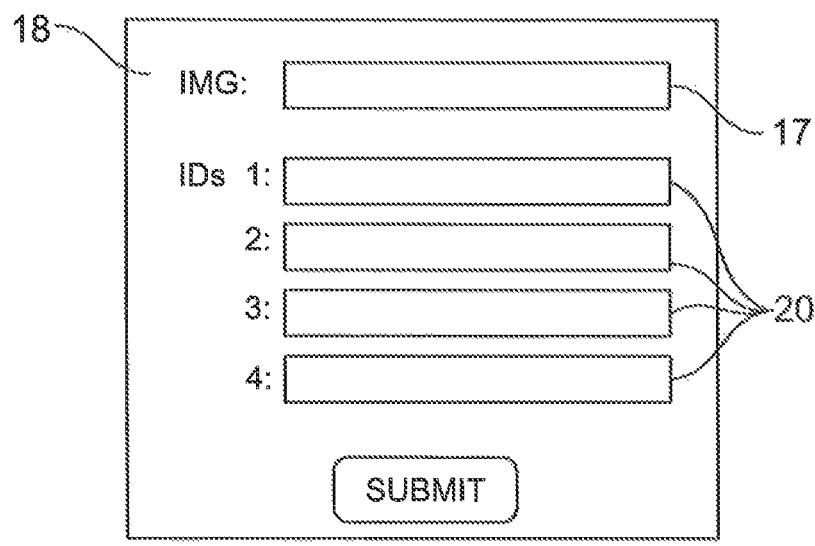
FIG. 6 is an input in accord with an embodiment of the present invention.
Figure 9:
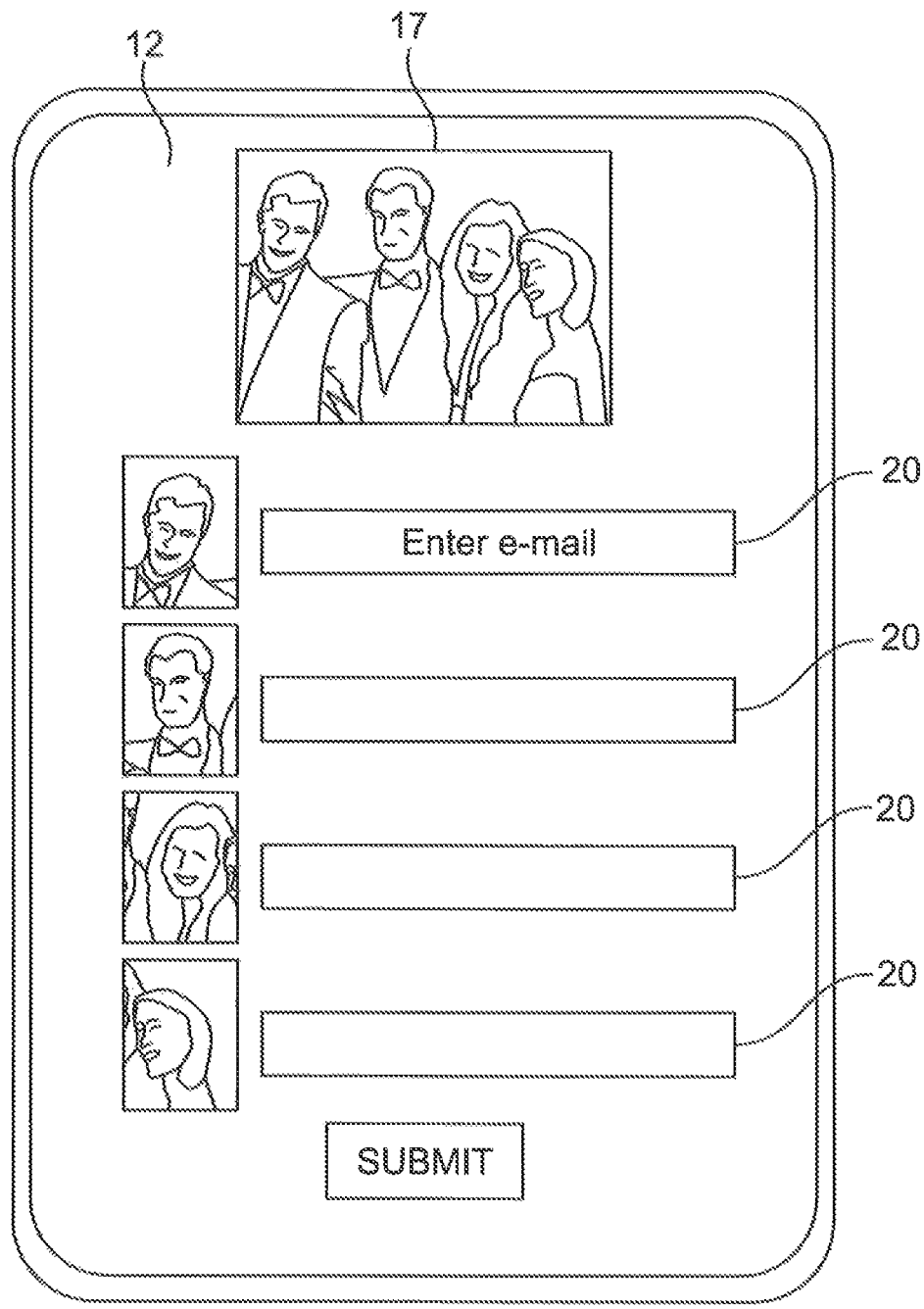
FIG. 9 is an input device in accord with an embodiment of the present invention.

In one embodiment, a photographer 15 can be equipped with an input device 16 as shown in FIGS. 3-5 that can be attached to a camera (FIG. 3), or worn on the photographer's arm or wrist (FIG. 4), a tablet (FIG. 5), or on any suitable mobile device. The device 16 may include an application or app specifically adapted to allow photo sharing using process and system 10 of the present invention. The device 16 allows the entry of information regarding the photos 12 via an input 17 (FIG. 6) such as the image number 18, or another associated file name, as well as information identifying the subject or subjects of the photograph (subject identifier 20). The subject identifiers 20 for multiple subjects in a photograph should be entered as the subjects appear from right to left in the photograph 12 designated as a through f in FIG. 2. Alternatively, subject identifiers 20 for multiple subjects in a photograph could be entered into a tablet app (FIG. 9) which is receiving a feed of photos from the photographer and running an application using face detection. The subject information can be any desired identifier 20 such as email address or cell phone number.

Persons attending the event can also be registered to be automatically eligible to receive a link to their photos. Their registration can include a subject identifier 20 to associate such persons with photographs in which they appear. This registered identifier 20 can be provided to the photographer 15, a supporting staff member or can be manually entered as part of an independent registration process before, during or after an event through a kiosk, tablet, SmartPhone, computer, or the like with an application or website supporting the photo sharing platform. The registration can also include, if desired, contact information for the subject such as an email address or cell phone number. A different subject identifier such as a name can also suffice if that subject identifier can be cross-referenced with a data set provided by an event organizers which associates that given subject identifier with respective contact information such as an email or cell phone number.

Figure 7:
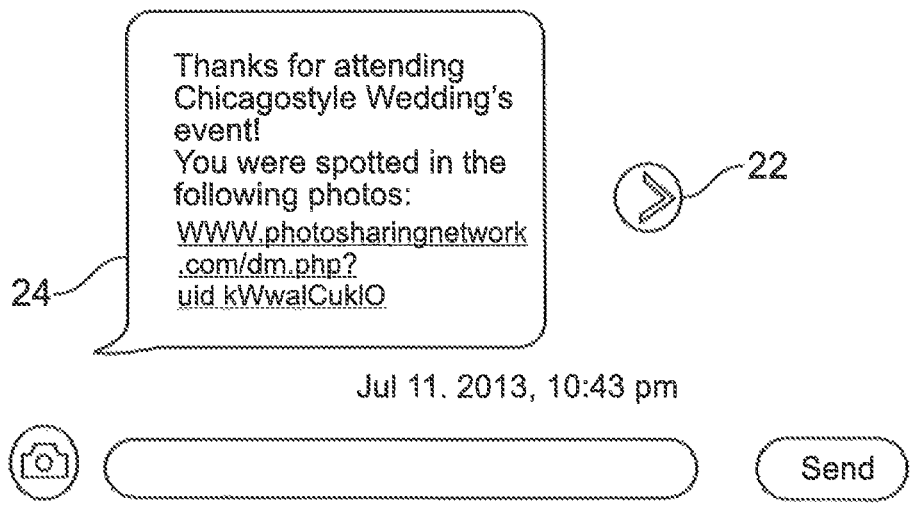
FIG. 7 is an alert in accord with an embodiment of the present invention.

In an embodiment of the present invention, the photographer 15 photographs subjects a-f, or any number of subjects. The photographer 15, or the subjects a-f, or any other person, enters this/her contact information, such as email or cell phone number, in the subject identifier 20 fields. This information along with the associated photograph 12 is stored in a database 13, and is uploaded to the server 14. After uploading to the server 14, the photograph 12 can be forwarded to the subjects a-f via their assigned subject identifier 20. For instance, the subjects a-f would receive an alert 22 informing them of the availability of the photograph 12 for viewing, and providing a link 24 at which the subjects a-f could view the photograph 12 (FIG. 7).

In addition, to sending the photograph 12 to the subjects a-f, the photograph 12 can include processing. For instance, the photograph can be processed to include a border around the photograph, information regarding the event at which the photograph 12 was taken, or other desired designs or effects. In another embodiment, after the photograph 12 is uploaded to the server 14, face recognition 26 can be run on the photograph 12 using any suitable face recognition software, including Face.com API (Acquired and privately integrated by Facebook), SkyBiometry.com API, Rekognition.com API, Lambda Labs: Lambdal.com, BetaFace.com, Cognitec: cognitec-systems.de, and Neuro Tech neurotechnology.com. The software determines facial metrics 28 for each of the subjects a-f appearing in the photograph 12. These facial metrics 28 can generally result from either geometric approaches, which look at distinguishing features (facial landmarks and associated ratios, distances and shapes using either two-dimensional or three-dimensional approaches), or photometric approaches, which are statistical and distill images in values and compares the values with templates to eliminate variance. The facial metrics 28 permit the software to identify other photographs 12 in which each of the subjects a-f appears. The facial metrics 28 corresponding to the subjects a-f of the photographs 12 are linked and stored on the server 14.

Additional photographs 12, perhaps those taken at the same event can be uploaded to the server 12. Face recognition 26 software performs facial recognition on the additional uploaded photographs 12, and determines the facial metrics 28 for the subjects a-f appearing in them. The facial metrics 28 of those subjects a-f identified are compared with the facial metrics 28 of subjects in the additional uploaded photographs 12. When the stored subjects a-f facial metrics are found to be present in a photograph 12, the photograph 12 is forward to that subject using the identifiers 20.

Figure 8:
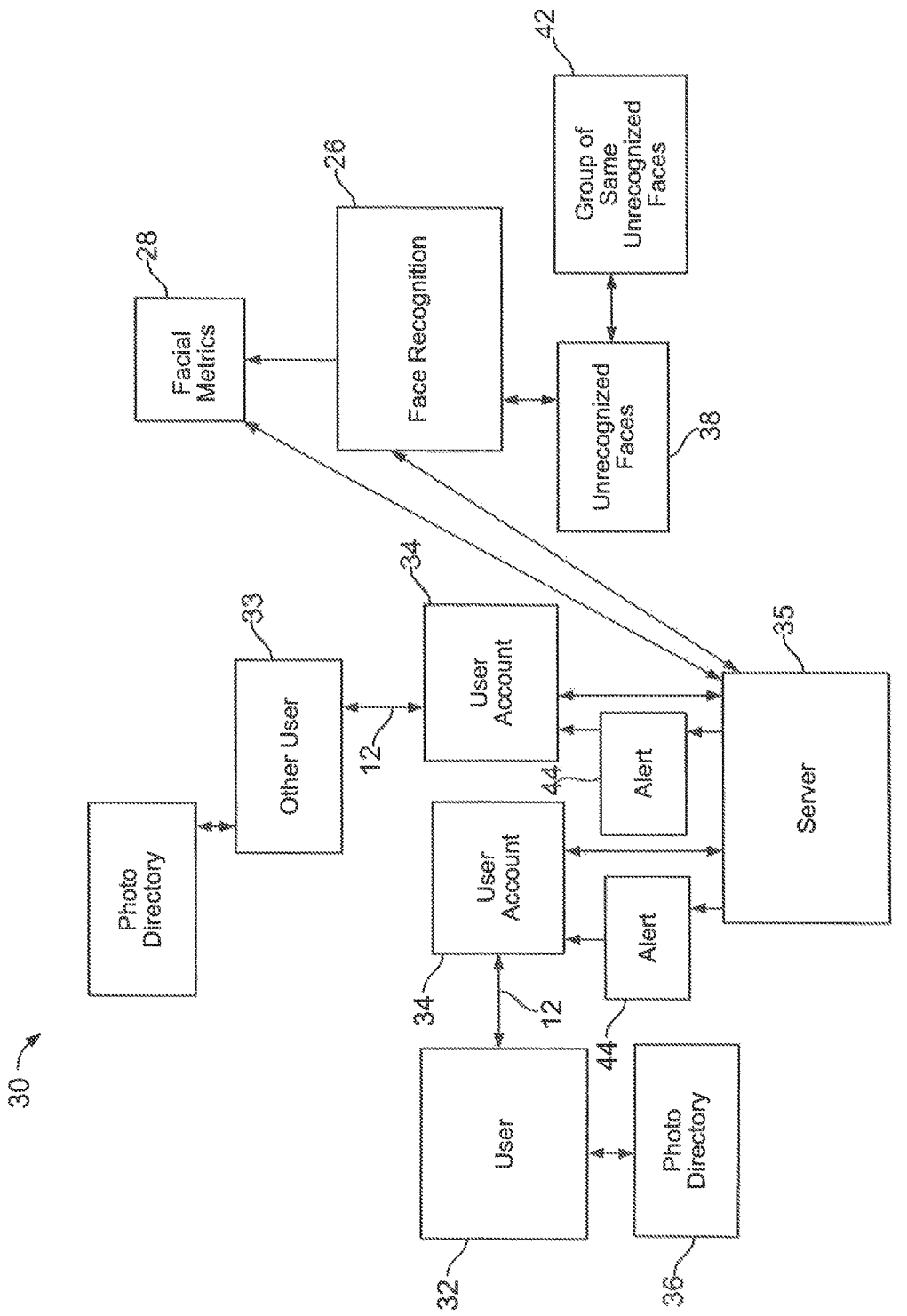
FIG. 8 is a schematic view of a photograph network sharing process of an embodiment of the present invention.

In another embodiment, the present invention provides a photo sharing network 30 FIG. 8). The network 30 allows users to store large quantities of their own photos like other photo aggregator sites, and also easily share photos 12 with family and friends, while allowing the sharing to be private. The photo sharing network 30 requires a user 32 and other users 33 to create an account 34. The user accounts 34 are stored on a server 35. The users 32 and 33 interact with the network 30 via a user interface. The users 32 and 33 can upload photos 12 to their accounts 34 via server 35, can import photos 12 stored on other websites and can even create dynamic connections with other websites or sources (like a SmartPhone or computer) which can check for new photos to import in perpetuity. In the latter case, these dynamic connections are enabled when a user gives permission to a service-specific application which can both check and passively initiate the uploading of new photos to one's private account on the photo sharing network.

The user 32 provides a registration photo or set of registration photos 12, or can use photos the user appears in shared photos by friends on the network, from which his or her facial metrics 28 are determined using face recognition. The facial metrics 28 are stored in connection with the user account 34. A user 32 may upload or import photos 12 to his account 34. These photos 12 are stored on a server 14. Facial recognition software acts on the photos 12.

Once uploaded to the server 14, the face recognition compares the user 32 facial metrics 28 with the uploaded or imported photos 12, and determines whether the user 32 appears in any of the photos 12. If so, the photos 12 are made accessible to the user through a directory 36 called, for example, "Photos of Me" associated with the user account 34. Moreover, others users 33 on the network 30 to which the user is connected have also provided their facial metrics 28. The photos containing other users' faces are directed to such other users 33, and in such a way, the same function is performed on the photos of all other users, looking for matches within their respective relevant user connections.

For unrecognized faces 38 appearing in the uploaded or imported photos 12, coordinates from the photograph 12 surrounding the face are determined and stored on the server 14. The portion or cutout of the photograph 12 containing the unrecognized face 38 will also be stored, and will continue to be associated with the original photo 12 file and associated user account. The facial recognition will create groups 42 of the cutouts of the same unrecognized face 38.

The user 32, through the interface, will have access to the group 42 of cutouts containing the unrecognized face 38 of the same person, as well as their associated photos 12. By identifying an unrecognized face cutout using an email address, name or other unique identifier, a user is able to share the parent photo and all other parent photos related to other cutouts within a group. These photos 12 can be easily shared with other users 33 on the network 30, such as the person, previously unidentified, who appears in the photograph 12. Once the photos 12 are shared, a connection between the users' accounts 34 is created such that the other user face is also searched for in photographs 12 uploaded to the server 14 by either user 32 or This connection requires permission of the other user 33.

When the face recognition 26 determines that the other user 33 face appears in a photograph 12 to a pre-determined level of certainty, the photo 12 is sent to the other user account 34. An alert 44 such as an email or text message can inform the other user 33 that the photo 12 has been sent to their account 34.

In another embodiment, an even such as a wedding is given a unique identifier. The set of photographs and users and subjects of photographs are identified as associated with a particular event are uploaded to and contained within the database. When the facial metrics of subjects in the photographs of that set are determined, the facial metrics of subjects in the relevant set of uploaded photographs compare those facial metrics of the users and subjects associated with the event.

While the specific embodiments have been illustrated and described, numerous modifications come to mind without significantly departing from the spirit of the invention and the scope of protection is only limited by the scope of the accompanying.

Having thus described the invention, I claim:

1. A photograph network sharing process comprising the steps of:

processing one or more photographs taken by a photographer at an event, to a server generally controlled by a photographer, and wherein the step of processing one or more photographs includes the steps of:

uploading the one or more photographs to the server; extracting facial metrics on any face depicted within each photograph, of the one or more photographs; and creating a database on the server that links each photograph, of the one or more photographs to corresponding extracted facial metrics;

registering a user attending the event, wherein the step of registering a user includes:

providing the user attending the event with an option to consent to receiving one or more photographs taken during the event and that contain an image of the user; extracting primary facial metrics from a photograph of the user, when the user consents to receiving the one or more photographs, defined as a registered user; creating a secure access to an event photo gallery uniquely associated to the registered user and stored on the server generally controlled by the photographer; storing the primary facial metrics on the server and linking the primary facial metrics of the registered user to the event photo gallery; and providing the registered user with an unique subject identifier or unique link for access into the event photo gallery uniquely associated to the registered user; and matching and linking a photograph, of the one or more photographs uploaded to the server, to the registered user, wherein the step of matching and linking a photograph includes:

automatically comparing the primary facial metrics with the extracted facial metrics stored on the database and corresponding to any and all photographs, of the one or more photographs, uploaded to the server; identifying a photograph, when comparing the primary facial recognition metrics to the extracted facial metrics contains a predetermined level of certainty that the photograph contains an image of the registered user; and automatically linking the identified photograph to the event photo gallery uniquely associated to the registered user, whereby the registered user accessing the event photo gallery uniquely matched to the registered user gains access only to all identified photographs taken during the event and which contain the image of the registered user.

2. The photograph network sharing process of claim 1, wherein the step of conducting an initial facial recognition metrics of the registered user attending the event is conducted from a photograph.

3. The photograph network sharing process of claim 1, further comprising the steps of providing coordinates for faces of subjects appearing in the uploaded photograph, and storing on the server the coordinates of faces not recognized as containing the user facial metrics stored in the server.

4. The photograph network sharing process of claim 3, further comprising the step of segregating the unrecognized faces from the upload photograph containing recognized facial metrics.

5. The photograph network sharing process of claim 4, further comprising the step of creating a group of photographs containing the facial metrics of each of the segregated unrecognized faces.

6. The photograph network sharing process of claim 5, further comprising the step of providing an interface for the user to view the photographs of each group of the segregated unrecognized faces.

7. The photograph network sharing process of claim 6, further comprising the step of allowing the user to share selected photographs from the group of photographs with a second user.

8. The photograph network sharing process of claim 7, further comprising the step of forwarding a photograph to another user when a subject therein is recognized with a specified level of certainty.

9. The photograph network sharing process of claim 1, further comprising the step of alerting the user when a photograph containing the user facial metrics is uploaded, and forwarding such photograph to the user with the matching facial metrics.

* * * * *